(12) United States Patent
Martino et al.

(10) Patent No.: US 6,778,807 B1
(45) Date of Patent: Aug. 17, 2004

(54) METHOD AND APPARATUS FOR MARKET RESEARCH USING EDUCATION COURSES AND RELATED INFORMATION

(75) Inventors: J. David Martino, Morningview, KY (US); Mitchell Smith, Cincinnati, OH (US)

(73) Assignee: Documus, LLC, Covington, KY (US)

( * ) Notice: Subject to any disclaimer, the term of this patent is extended or adjusted under 35 U.S.C. 154(b) by 281 days.

(21) Appl. No.: 09/952,452

(22) Filed: Sep. 14, 2001

Related U.S. Application Data

(60) Provisional application No. 60/233,048, filed on Sep. 15, 2000.

(51) Int. Cl.[7] ................................................ G09B 9/00
(52) U.S. Cl. ..................... 434/362; 434/307 R; 725/24; 705/1
(58) Field of Search ............................... 434/118, 330, 434/322, 323, 362, 365, 307 R; 705/10, 14, 1; 725/24

(56) References Cited

U.S. PATENT DOCUMENTS

| | | | |
|---|---|---|---|
| 5,124,911 A | | 6/1992 | Sack |
| 5,724,262 A | | 3/1998 | Ghahramani |
| 5,808,908 A | | 9/1998 | Ghahramani |
| 5,809,242 A | * | 9/1998 | Shaw et al. ................. 709/217 |
| 5,819,285 A | | 10/1998 | Damico et al. |
| 5,822,745 A | * | 10/1998 | Hekmatpour ................ 706/59 |
| 5,826,244 A | | 10/1998 | Huberman |
| 5,890,138 A | | 3/1999 | Godin et al. |
| 5,907,831 A | * | 5/1999 | Lotvin et al. ................. 705/14 |
| 5,909,589 A | | 6/1999 | Parker et al. |
| 5,931,901 A | | 8/1999 | Wolfe et al. |
| 5,947,747 A | | 9/1999 | Walker et al. |
| 6,438,353 B1 | * | 8/2002 | Casey-Cholakis et al. .. 434/350 |
| 2001/0034645 A1 | * | 10/2001 | Tenembaum .................. 705/14 |
| 2001/0039002 A1 | * | 11/2001 | Delehanty .................... 434/322 |
| 2002/0019764 A1 | * | 2/2002 | Mascarenhas ................ 705/10 |
| 2002/0032576 A1 | * | 3/2002 | Abbott et al. .................. 705/1 |
| 2003/0115023 A1 | * | 6/2003 | Nickerson et al. .......... 702/188 |

OTHER PUBLICATIONS

Google Search: continuing medical education, http://www.google.com/search?q=continuing+medical+medical+education&num=100&sa=Google+Search, Oct. 24, 1999.
Program Evaulation—Involving Issues in Immunization, http://www.cme-ce.com/cgi-bin/NewSubmit.exe/courses/shared/vaccine01/evaulation.html, Oct. 9, 1999.
ChannelHealth,Merck-Medco Form Healthy Alliance, http://thestandard.com/article/display/0, 1151,9420,00.html, Feb. 2, 2000.
Health Care Leaders Form Online Exchange, http://thestandard.com/article/display/0,1151.13454,00.html?nl=mm, Mar. 29, 2000.

(List continued on next page.)

*Primary Examiner*—Teresa Walberg
*Assistant Examiner*—Kathleen M. Christman
(74) *Attorney, Agent, or Firm*—Frost Brown Todd LLC

(57) ABSTRACT

Methods and apparatus for assessing and linking market research questions to participant's (user's) credentials, where the market research questions are integrated into selected continuing education courses or product training. The users may not earn credit for such continuing education unless they answer the market research questions. This method allows a mechanism to perform market research on any group of professionals that require continuing education or training. The method and apparatus of the various embodiments of the present invention have applications on the Internet, stand-alone and networked computer systems, integrated computer-television systems, and conventional communication systems, such as voice telephony.

7 Claims, 5 Drawing Sheets

OTHER PUBLICATIONS

Market Research on the Internet Has its Drawbacks, Feb. 2, 2000.

Conducting Marketing and Opinion Research using the Internet, http://www.esomar.nl/guidelines/intern et_guidelines.htm, Feb., 2000.

Decision Analyst, Inc.—Marketing Research & Marketing Consulting, http://www.decisionanalyst.com/, © 2000.

BioInformatics, LLC—Corporate Overview, http://www.gene2drug.com, © 2000.

Jstreetdata.com—Medical Market Research Made Easy, http://www.jstreetdata.com/default.asp, © 2000.

Medical Devicelink—Using the Internet to Support Market Research, http://www.devicelink.com/grabber.ph p3?URL=http://www.devicelink.com/mddi/archive, Jun., 2000.

Medical Industry Information Report; *Internet Tool Enables Rapid Primary Market Research;* vol. 5, No. 1; 2 pgs., Winter 2000.

Untangling the Web, Steve Crabtree; Quirks.com, Jul., 2000.

Patent Database Search Results: market AND "distance learning" in 1976–2000 (2 pgs).../nph–Parser?Sect1=PTO2&Sect2=HITOFF&p–1&u=%2Fnetahtml%2Fsearch–bool.html&r, Jul. 5, 2000.

* cited by examiner

METHOD AND APPARATUS FOR MARKET RESEARCH USING EDUCATION COURSES AND RELATED INFORMATION

This application is a non-provisional application under CFR 1.53(c), which claims priority from the earlier, filed provisional application Serial No. 60/233,048, which was filed on Sep. 15, 2000.

TECHNICAL FIELD

The present invention relates generally to computerized market research instruments integrated into educational systems.

BACKGROUND OF INVENTION

Continuing Education Background

Many of today's professionals and technical specialists are required to perform continuing education and training in their area of expertise, to keep abreast of current technology, techniques, trends, and findings, and to maintain their knowledge base. These professions often require documentation of such education for an individual to maintain professional credentials. Individuals therefore must participate in approved continuing education training programs, accruing a specified number of hours of training, over a given period of time, in order to maintain their professional certification. Approval is typically given by the profession's licensing body, governing body or governmental office. The training and education are often measured in credit hours. The entire effort is often referred to as continuing education, although specific professions often have specific terms, such as continuing medical education (CME) or continuing legal education. (CLE), or continuing professional development (CPD).

Continuing education credits can be obtained from a variety of sources, traditionally from attending professional seminars, viewing video presentations on professional topics, or reading refereed journal articles. Credits can be obtained over the Internet by reading materials (on-line, off-line, or in print media), following a case simulation or following a video or audio presentation. Simulations can be linear, or can be designed for individual interaction. Video and audio presentations may be recorded, real-time or a combination of both. Such presentations may be downloaded by the individual for viewing or listening at a more convenient time, or viewed or listened to by online media streaming. Lectures and discussions may be done using Internet communication technologies as part of the continuing education course. It is foreseeable that actual procedures will be at least viewable using the Internet, and may offer interactivity where individuals can earn credits for "sitting in" on procedures virtually.

In some cases, tests are required to confirm completion of the course, and grading may occur on-line or via a mail-in form. While some courses are free, most require a payment for the service. Using the Internet to provide continuing education benefits both the professional and the provider. The professional is not required to travel, often has greater selection of courses, and can often obtain the credit at a lower cost than other sources. The provider can reach a greater audience, minimize publishing costs, and automate presentation, testing, grading, notification and payment.

For a course to provide usable credit, it must be approved by that profession's institutional body, which is responsible for continuing education. These bodies are often the national or state professional organizations or boards, and often are also responsible for licensing of the professional. The amount of credits the course is worth is frequently based on the estimated contact hours, or the time an individual is expected to spend taking the course or following the presentation or event. Some professions allow approved credits by other professions to apply to their own. For example, respiratory therapists may receive CE credit for successfully completing nurse continuing education courses. Courses are often authored or provided by practicing individuals, academic professionals, institutions, manufacturers of goods and/or providers of other related services.

In order for credit to be given for a course, professionals must show attendance, proof that they have consumed course materials (e.g. read the required readings), or passed a test of understanding of the course material. One method that is used to confirm that an individual is achieving the required amount of contact hours for an on-line course is to record the time spent on the course. Also, for on-line video or audio presentations, a user may be prompted for an acknowledgement (e.g. a password or other identifier, a response to a question, a keystroke,) at various times to confirm that the individual is present and watching or listening to the presentation and thereby is earning his or her credit. For that credit to be registered with the individual's licensing body, the individual or the course presenter must provide identification of both the course and the individual and proof of completion to the licensing body. Identification of the course often includes the name, topic and approval information of the course. Identification of the individual often includes the name, professional registration or similar code number, work information, and mailing information. On-line continuing education providers can provide users with a printable certificate to help them document their credits earned, or may provide a on-line logbook to assist the user in keeping track of their credits. Other methods of providing this proof to the accrediting or licensing body is for the provider or the individual to send a hardcopy by mail, to phone the body, to send copies of the questions and answers, or to transmit this information via e-mail.

Many professions require continuing education or on-going training, and frequently require completion of approved courses to maintain licensures or certifications. Such professions are those where the body of knowledge or the standards of practice are continually changing or evolving. Technology changes, scientific findings, new laws and regulations, and new products are often drivers for these changes. Some licensures and certifications require regular testing and renewal. In addition to maintaining credentials, career development is often a goal of professional education, particularly in improvement of business or technology skills. We refer to any effort made to seek further education or training on one's profession to be continuing education, with emphasis and focus on those professions where such efforts are needed to remain in practice. The industries where one would find such professions include:

Medical and healthcare (e.g., physicians, pharmacists, nurses, technologists, therapists, psychologists, social workers, etc.)
Veterinary science
Legal and Regulatory
Accounting, Finance, Investment, Banking, and Insurance
Real Estate
Information Technology
Automotive Repair, Maintenance and Service
Capital Equipment Repair, Maintenance and Service (e.g., machine tools, restaurant equipment, construction equipment, HVAC equipment, etc.)

Aircraft and Aviation Repair, Maintenance and Service

Aircraft Piloting and Crew

Engineering, Construction, and Skilled Trades

Project Management Professionals, Certified Purchasing Managers, Professional Secretaries and other business professionals.

Design professionals (e.g. kitchen designers, interior designers, architects)

Food service professionals

Government personnel

Travel agents

Funeral directors

This is not an exhaustive list, as many organizations and professions change their criteria for professionalism, certification, and licensure.

University, collegiate and lower levels of schooling can be presented on the Internet, or can use the Internet to assist in communication, distribution of information and research. When the course instructor or members of the class are geographically dispersed, this is often referred to as distance learning. In general, the Internet can be useful anywhere transmission, presentation or sharing of information is needed in the classroom. Other learning environments exist that are predominantly for personal interest and do not provide credit toward a degree, certificate or diploma. On the Internet, many learning opportunities exist, both formal and informal, that are relevant to various embodiments of this invention.

Product training is another form of professional training that is relevant to the various embodiments of this invention. Product training can take the form of in-service training, such as a sales or training demonstration of a complex device (e.g. a medical device, a software package), or other training where individuals are instructed on the use of a new product for their job. While such training may have continuing education benefits, largely such efforts are not accredited. Nevertheless, such training is often necessary or required for an individual to be proficient in his or her job function, and proof of such training may be required by the firm or organization to meet quality system requirements (e.g. ISO 9001, Joint Commission on Accreditation of Healthcare Organizations compliant procedures).

Continuing education, courses, training, distance learning and other educational opportunities carry value to the individuals using these services. Therefore, these educational opportunities can be used as incentives, rewards, perks, gratuities, and other inducements to such individuals.

Market Research Background

Marketing research (or market research) is the function of obtaining and providing information about a customer, a consumer, a user, or the marketplace to the marketers of a product or service. Marketers can include manufacturers, distributors, industry analysts and other companies and institutions. Marketing research studies are specific efforts intended to explore, describe or investigate a market or target segment of a market. The device or method used to obtain information from the respondents is often referred to as the marketing research instrument, and a single marketing research study may use many instruments and methods. A participant, or respondent, is an individual selected by the researcher from whom to inquire the desired information. Marketing research is done in every industry at varying levels of sophistication and prevalence. Methods vary from industry to industry, often depending on the type information desired and the nature of the respondents. Both qualitative and quantitative information can be obtained from marketing research. Marketing research studies can include both information about the market, the customers, the product, competitors and competitive products, and other types of sociological, psychological, behavioral and economic information. Some examples and terminologies used in market research studies include:

1. Concept testing and evaluation,
2. Product testing and evaluation,
3. Print, video, audio, multimedia and on-line advertisement testing, including theater testing,
4. Brand and image, awareness, equity and usage studies,
5. Customer value and satisfaction studies,
6. Market size and share studies,
7. Focus groups and custom panels, as moderated by humans, automated bots, or without moderation,
8. One-on-one interviews, where interviewing is done by humans or automated bots,
9. Web site evaluations,
10. Usability and use studies,
11. Forecasting studies,
12. Experimentation,
13. Market simulations,
14. Conjoint and discrete choice studies,
15. Predictive modeling,
16. Product placement studies,
17. Profiling and segmentation studies,
18. Tracking and longitudinal studies,
19. Audits of business practices, stocks, services, sales, procedures and customers,
20. Global validation studies,
21. Omnibus testing,
22. Other Qualitative research, and
23. Other Quantitative research All of these may have embodiments that can be conducted on the Internet.

Market monitoring can also be performed wherein key market variables can be continually measured for trends and shifts, including monitoring for so-called "viral" changes in the marketplace. Other types of studies exist, such as product evaluations and usability studies that use many of the same tools and techniques as market research studies, although often with less rigor.

Advances in hardware and software technology continually improve the richness and availability of various types of media. Modification and improvements to marketing research strategies in the face of these new technologies can provide less intrusive, more information-rich methods of performing studies.

Participant selection: A key part of achieving the objective of any marketing research study is properly finding, screening, and selecting the sample to be studied. Typically, the target population will have a set of defining features, such as demographic characteristics or purchasing authority, that makes it of interest to the researcher. The sample must accurately represent this population in order for findings and conclusions about the sample to be extendable to the population.

Random selection of participants has traditionally been regarded as the preferred method of selecting individuals to avoid statistical or study bias. In most cases, however, no selection is truly random, and is predominantly a random selection of an available list of names. The content of this list and the responsiveness of the individuals contacted on that list affect the true randomness of the selection. Other methods of selection, such as snowball sampling, are inherently non-random yet frequently used, particularly for populations where finding qualified individuals for a study may be difficult.

Proper identification and qualification of the respondents, or at least their defining characteristics, is necessary in virtually all areas and forms of marketing research. In examining a group of prospective respondents, selection criteria are use to qualify or screen the group to choose which are appropriate to include in the sample for the study. Typically, screening requires a prior exchange of information that identifies the respondent and perhaps the pertinent characteristics to the researcher. This information can be difficult to obtain, is limited by privacy concerns of the individual, takes time and money to obtain, may be incomplete, and may be purposefully or accidentally inaccurate. Verification can theoretically be done by cross-checking an individuals identity by another communication medium (e.g. phone, mail), checking employment status, by credit card verification, or by otherwise referencing the identity to another information source. These limitations can influence the quality and magnitude of a marketing research study, as compromises of cost, error and bias may be necessary to complete the study in time, financial, and performance requirements.

Importance of researching professionals: Researching professionals or those in industry has value on multiple levels. First, it researches the characteristics of the individual. Secondly, it provides insight into the business processes and decisions in their business entity. Thirdly, it can provide understanding of the industry and market in which that individual and business operate. Lastly, it can provide understanding of the needs, uses, and decision-making for products and services. For example, in the healthcare industry, marketing research studies might be used to understand (1) individual behavior, (2) the healthcare standards of practice in a given demographic, (3) the market potential for a new drug or device, or (4) at what call points a new drug or device might be best sold. Overall, obtaining information from business professionals is an excellent way to research the business and industry in which they operate, in addition to the individuals themselves.

Market research coupled with continuing education works best for professionals because:
1. they have distinguishable identifications and characteristics,
2. they are to some extent captive or required to pursue the education,
3. a whole industry typically requires such types of education, so a market research study would have a better chance of being representative of the industry population, not just a portion of it.
4. professionals are more technically competent and capable of providing information.

Advantages and limitations of on-line market research: Marketing research is done on a variety of media, including personal and group interviews, mail, phone, interactive television, computers, and on the Internet. It is foreseeable that new types of media and electronic hardware will facilitate new methods of collecting and providing information that will have strong applications in marketing research.

In its current state, Internet-based marketing research has several advantages and limitations, relative to the more traditional methods of marketing research. Currently, the advantages of performing market research by the Internet include (1) flexibility of data collection, (2) diversity of questions, (3) managerial control of interviewing resources, (4) quick response rate, (5) perceived anonymity of respondents, (6) insulation from socially-desirable response bias, (7) obtaining sensitive information, (7) low potential for interview bias, (8) speed, (9) continuous and ongoing sampling and (10) cost. Because of its media limitations and ease of exit, the use of physical stimuli and quantity of data obtainable, respectively, are less effective. The primary weaknesses of Internet-based market research is sample selection and control and control of the data collection environment (Marketing Research: An Applied Orientation, Naresh K. Malhorta, Prentice Hall, Upper Saddle, N.J., 1999. ISBN 0-13-083044-5). Also, cookies and other identifiers, whether on the client or server side, can be used to track an individual and are useful for such tools as follow-up or longitudinal studies. Use of any computerized environment to administer a market research instrument allows the use of new tools and techniques, such as computer-aided personal interviewing, conjoint and discrete choice models, and simulations.

Components of successful Internet-based marketing research include relatively secure environment, control of the presented research on-line "environment", and knowledge of the pertinent characteristics of the potential respondent. Often, the (currently) anonymous nature of the Internet hinders accurate identification of respondent characteristics. Assurance and confidence in obtaining these characteristics accurately, completely or sufficiently, is limited due to privacy perceptions. Furthermore, the typical behavior of the Internet (e.g., surfing) creates additional obstacles in obtaining complete information and attracting only a desired respondent. While the environment outside of the computer cannot be controlled, the environment within the computer can be minimized for external bias. Those skilled in the art and practical application of marketing research understand that other principles of successful marketing research, including minimizing bias, proper survey and question design, and proper interviewing techniques, are necessary.

Another value of performing market research using on-line tools is the ability to automate other parts of the market research process. For example, the analysis, monitoring, data recording, data downloading, data manipulation and reporting of internet market research studies which can be automated and made accessible via the internet to both study clients and administrators. This has particular advantage in assuring that a study is performing as expected. Clients can also load or create instruments directly to a software engine that administers the studies. Other aspects of the business process, such as quoting for a study and estimating study parameters, can also be automated and presented on-line.

Incentives and market research: Incentives can provide better response rates and a greater willingness to participate in more time-consuming studies. Incentives must be chosen such that they do not bias the respondent's attitude or the accuracy of the response. Common incentives can include monetary rewards ("honoraria"), coupons or cash-like rewards, lottery or drawing entries, and food and entertainment gifts.

State of the art: Currently, Internet-based market research requires voluntarily provided information to be given by potential respondents to the market researcher, often involving screening questionnaires. The researcher is still at significant risk that the individual is not providing accurate or complete information as to their defining characteristics. Secondary methods of identity verification are limited to e-mail verification and requesting accurate name and address for the ostensible purpose of granting incentives. The weaknesses described above are inherent in some degree to all currently known embodiments of publicly available marketing research via the Internet. At this time, the ability to access a large and valid body of desirable Internet users is an important advertising claim.

To select survey participants, the vast majority of internet market research uses opt-in techniques where visitors agree to participate in a survey on a volunteer basis, often by filling out a form on the firm's site. Eight general methods are used to select these respondents. These methods can be used in conjunction with one another, and in conjunction with the various embodiments of the invention described below:

1. Nth visitor techniques on the web site. If visitors to a particular web site are chosen as the initial target sample for a study, "Nth visitor" techniques are often employed where every Nth (e.g. fifth, hundredth) visitor is presented with the opportunity to participate in a market research study. Supplemental qualification questions often follow. Burke Inc. is one such company that employs this technique.

2. Selection through other media or communication methods. Individuals are selected from lists, often randomly, and contacted by phone, fax, mail or e-mail, requesting them to participate. Additional selection and qualification criteria may be queried through this process. The user is then given a web site address, often with a code or study identifier, and requested to visit the web site. Once on the web site, the respondents are subjected to the market research study. Inviting individuals to participate in a study via e-mail is often undesirable because e-mail addresses can change easily and therefore may not be up to date, and because unsolicited e-mails are often viewed negatively (i.e. "Spam") by potential respondents.

3. Event-based selection. When a web site user triggers a particular event, such as a purchase or a cancellation of an order in process (e.g. a shopping cart), the user is selected for a survey to investigate the user's state of mind, the reasons triggering the event, or perhaps the satisfaction of the user with the service. SurveySite uses an event-based selection to analyze why users cancel their on-line shopping cart.

4. Self-selection or volunteer techniques. Some market research firms encourage people to visit a particular web site and sign-up as a panel member or immediately participate in a survey, often providing detailed information about their identity, the demographics, their behaviors, and the purchasing habits. TestNow is one such firm that uses this technique to build a panel of potential future respondents. Northstar Interactive also creates panels, then calls upon selected members of that panel based on qualification criteria.

5. Random selection and placement of study equipment. A less common method uses random selection (e.g. via phone or mail) to locate individuals or households and then places Internet hardware (such as TV set-top boxes, computers, or other study equipment) at the household. These firms, such as InterSurvey, often provide free connectivity in exchange for completing a specified amount of surveys.

6. Voluntary selection of individuals actively interested in providing information. PlanetFeedback, among others, offer a venue for individuals interested in letting their opinions or perceptions be known, either to a particular firm, to the industry, or to the general public.

PlanetFeedback's approach provides the individuals with a facilitating communication tool and aids in conveying the message to the desired target. By doing so, they also provide their client firms with consumer information in a prescribed and more usable format.

7. Resident applications on a client computer, server computer or hardware device that monitor information flow. NetValue builds panels of Internet users and installs a software program that continuously monitors and records the panelists Internet-related behavior.

8. Use of the Internet as a communication tool. Other firms use e-mail, web pages, and downloadable files to speed the market research process. No particular functionality of the Internet is used other than its ability to transmit media near instantaneously.

9. Recording demographics of known users for advertising purposes. In an environment where access to the Internet is controlled to certain users (e.g. a school), information about the users may be available by the administrator for user access. This information may have value to those interested in monitoring the users'Internet usage habits and preferences. For example, ZapMe Inc. provides computers and internet access to schools in exchange for demographic information about the students'demographics (age, gender, grade level, school zip codes) that is then used in targeting advertisements provided on ZapMe's service.

With the growing communication, interactivity and multimedia capabilities of the Internet, almost any type of market research instrument or technique may now be employed, with varying degrees of smoothness and usability. Some such instruments and techniques include:

1. Surveys, evaluations, and choice models are presented on web pages or portions of web pages.

2. Surveys by e-mail, where answers and comments may be included in the e-mail, where some entry method is embedded in the e-mail or where a link to a web page is included in the e-mail.

3. Focus groups or interviews, where the discussion is done real-time or is posted as a message on the web, and where this discussion can be text, audio, video or multimedia. These may also be performed via e-mail, often in conjunction with a web site posting.

Insight Express, among others, has automated some of the programming techniques for surveys, including use of preformatted questions, on-line selection from a multitude of target audiences, and the quoting process associated with the specified survey and target audience. Like others, summary and monitoring of the response of the study is also automated and available to client on-line.

SUMMARY OF THE INVENTION

The present embodiments of the invention minimize bias while improving identification, selection, incentives and responsiveness of the study sample through an automated means. One way to remove the weakness of sample selection is to draw samples from a more limited group of potential respondents, and obtain information about them that can allow you to screen them even further. The method and apparatus use the information needed to provide a professional continuing education course, or other types of distance learning courses, as a basis for electronically qualifying and identifying the individual for a marketing research study. Because specific professional groups require specialized training content, and because only specific professional groups would be interested in certain educational and technical content presented on the Internet, on-line continuing education courses are an excellent way to filter potential respondents, for the purpose of achieving a qualified marketing research sample.

The information needed to show completion of course requirements and notify the accrediting body for an individual can therefore identify that individual and his or her relevant professional characteristics. Using the professional registration characteristics can provide assurance that the individual is providing his or her true identity, thereby filtering out unqualified respondents, casual surfers, and others outside the target population. Identification of the individual as a certain type of professional allows the researcher to make assumptions about the professional and educational background of the individual. In this way, the present embodiments reduce the problem and concerns about accuracy of identity and relevant characteristics.

By performing marketing research in the venue of continuing education, the various embodiments of the invention reduce the unwillingness of individuals to share personal information, thereby improving the response rate and the amount of information provided by potential respondents. The continuing education venue also maintains a focus on the professional environment, and reduces the likelihood that an undesirable respondent (e.g. a competitor, someone playing on the web) would be subjected to a market research study. The proximity of market research to a continuing education also reduces the likelihood that an individual other than the target respondent (e.g. the target respondent's secretary) responds in the target respondent's place.

By intermingling the continuing education and marketing research, or by encouraging marketing research questions to be answered before issuance of continuing education credit, respondents are inhibited to casually "surf" away from marketing research study. This promotes greater response rates and richness of a given instrument. In this way, the researcher may also gain greater control over the media's environment and reduce noise factors in the study. Continuing education users may already be expecting to spend time at a particular site, and may be expecting to answer questions; this predisposition makes continuing and distance education users an excellent group on which to perform market research. The mental association of course questions with market research questions may also improve the completion rate.

Continuing education courses also provide an opportunity for incentives for marketing research participation. By providing incentive, you can increase the willingness for large quantities of data and increase the response rate. Continuing education courses are an excellent incentive, as they are a required element in the professional career and do not necessarily generate bias. Education services provided on-line carry a value to the users and are one of the few benefits that can actually be fully transmitted on-line. Furthermore, they can be provided at a greater value to the respondent than the actual cost to the researcher.

This method of linking market research and continuing education works best for professionals or other individuals who have educational requirements and who make purchasing or specification decisions on products or services. The type of education is not limited to professional continuing education, and the method can also apply to distance learning and on-line learning assistance for K-12 schooling, collegiate education, business-related training, and general personal interest courses.

Therefore, one embodiment of the invention comprises a method of performing market research comprising the steps of providing market research instruments; and providing continuing education courses. This method may further include obtaining user demographic data. In an alternative embodiment, the method may include the step of providing answers to continuing education courses to a continuing education agency. In another embodiment the method may include varying which said market research instruments are provided based upon said demographic information collected.

Another embodiment of the invention comprises a method of selecting respondents for market research studies done on a computerized system where previously available information about the potential respondent is compared to the pre-established selection criteria of a battery of market research studies for determining which, if any, of the studies the potential respondent is qualified, and choosing amongst the studies for which the potential respondent is qualified to determine which study will be presented to the potential respondent. This method may further include storing the selection criteria of the battery of market research studies in a database of variables and required value ranges. Alternatively, the selection criteria may include professional credentials, job title, job function, or demographics. The potential respondent's identity or relevant characteristics may be known beforehand through registration for an on-line distance learning course or service. Alternatively, the potential respondent's identity or relevant characteristics may be known beforehand through voluntary sign-up.

Another embodiment of the invention comprises a method of selecting respondents for market research studies done on a computerized system where previously available information about the potential respondent is compared to the pre-established selection criteria of a battery of market research studies for determining which, if any, of the studies the potential respondent is qualified, and choosing amongst a battery of possible market research studies, comprised of studies from multiple clients, for which study the potential respondent is qualified to respond to determine which study will be presented to the potential respondent. Alternatively, the study chosen to present to the potential respondent may depend on the priority of the study's completion.

Another embodiment of the invention comprises a method of selecting respondents for market research studies done on a computerized system where previously available information about the potential respondent is compared to the pre-established selection criteria of a battery of market research studies for determining which, if any, of the studies the potential respondent is qualified, and choosing amongst the studies for which the potential respondent is qualified to determine which study will be presented to the potential respondent, presenting said market research instruments and providing an educational course. The educational course may be used as an incentive to encourage participation for or responsiveness in the market research study. Furthermore, the educational course may be used to discourage or prevent participation in a market research study by undesirable respondents. Information needed about an individual for the educational course for registration, attendance, or credit issuance purposes may be used to provide information about the respondents for use in the market research process. This information may be used to verify the identity or characteristics of the individual for the market research study. Alternatively, the name, license number or professional membership number of an individual may be used to access additional information about the individual from a database. Additional information may be used for qualification or identity verification in the market research process. For instance, a credit card account may verify the identity of an individual.

Another embodiment of the invention comprises a method of selecting respondents for market research studies done on a computerized system where previously available information about the potential respondent is compared to the pre-established selection criteria of a battery of market research studies for determining which, if any, of the studies the potential respondent is qualified, and choosing amongst the studies for which the potential respondent is qualified to determine which study will be presented to the potential respondent, presenting said market research instruments and providing an educational course where the environment, site, or venue of an educational course is used to present the market research instrument. The education course may be a professional continuing education course. The educational course may be directed to a specific profession such as a professional continuing education course for a licensed healthcare professional, legal specialist, accounting professional, or others. The educational course may provide training in business processes or products.

Another embodiment of the invention comprises a method of selecting respondents for market research studies done on a computerized system where previously available information about the potential respondent is compared to the pre-established selection criteria of a battery of market research studies for determining which, if any, of the studies the potential respondent is qualified, and choosing amongst the studies for which the potential respondent is qualified to determine which study will be presented to the potential respondent, presenting said market research instruments and providing an educational course where the environment, site, or venue of an educational course is used to present the market research instrument. The course may be presented before, after or intermingled with the market research instrument. Respondents of market research studies may earn credits or coupons good for payment for educational services or products. Completion of the market research study may be encouraged by withholding the issuance of credit for an accredited course until after participation in the market research study. Such market research studies may be performed over the Internet where market research instruments are presented with educational courses on other websites, specifically, integrating the market research study with a continuing education course on the website associated with the educational course. Alternatively, many courses on multiple education sites may exist and the market research studies may be given in proximity to these courses.

Another embodiment of the invention comprises a method of selecting respondents for market research studies done on a computerized system where previously available information about the potential respondent is compared to the pre-established selection criteria of a battery of market research studies for determining which, if any, of the studies the potential respondent is qualified, and choosing amongst the studies for which the potential respondent is qualified to determine which study will be presented to the potential respondent, embedding said market research instruments and providing an educational course/tutorial on or within an electronic device or product, wherein said device or product has embedded electronic communications systems (i.e., wireless), while an operator is testing or training on it.

Another embodiment of the invention comprises a computerized method for identifying matches between participants and market research instruments comprising maintaining at least one database comprising at least one profile corresponding to a potential participant (participant profile); at least one market research instrument; at least one target profile of demographic information associated with one or more of said market research instruments; executing computer executable instructions encoded on a computer readable medium to access said at least one database to compare said participant profile and said target profile; select said target profile that sufficiently corresponds to said participant profile; select said market research instrument associated with said target profile; integrate said market research instrument with an educational course associated with said participant's educational endeavor (integrated study); present said integrated study to said participant. Market research instruments may include surveys, questionnaires, or freeform feedback. Sufficient correspondence may be determined on a case-by-case basis but will generally be a predetermined tolerance of matching characteristics between a potential participant's profile and a target profile. Integration of said market research instrument and said varying forms of educational endeavors may include providing the market research instrument before, after, or interspersed with the educational endeavor.

Another embodiment of the invention comprises a computerized method for identifying matches between participants and market research instruments comprising maintaining at least one database comprising at least one profile extracted from a registration file associated with an educational course for which a potential participant (participant profile) has registered; at least one market research instrument; at least one target profile of demographic information associated with one or more of said market research instruments; executing computer executable instructions encoded on a computer readable medium to access said at least one database to compare said participant profile and said target profile; select said target profile that sufficiently corresponds to said participant profile; select said market research instrument associated with said target profile; integrate said market research instrument with an educational course associated with said participant's educational endeavor (integrated study); present said integrated study to said participant; and require said market research instrument of said integrated study be completed prior to completion or credit issuance of said educational course of said integrated study.

Another embodiment of the invention comprises a system for identifying matches between participants and market research instruments comprising at least one storage device; at least one processor programmed to maintain in the storage device, for a predetermined length of time, at least one profile of demographic information corresponding to a participant (participant profile); at least one market research instrument [survey, questionnaire]; at least one target profile of demographic information associated with one or more of said market research instruments; access said at least one storage device to compare said participant profile and said target profile; select said target profile which corresponds to said participant profile; integrate said market research instrument, associated with said target profile, with a computerized educational course (targeted study); present said targeted study to said participant; require said market research instrument of said targeted study to be completed prior to processing completion of said education course of said targeted study.

Another embodiment of the invention comprises a computer readable medium having computer executable instructions for identifying matches between participants and market research instruments comprising obtaining at least one characteristic identifying a potential participant (participant characteristic);

matching said at least one participant characteristic with at least one market research instrument; integrating said market research instrument with a computerized educational course. Generally, said characteristics may be of a demographic, professional, or personal nature.

Another embodiment of the invention comprises a computer readable medium having computer executable instructions for identifying matches between participants and market research instruments comprising obtaining at least one characteristic identifying a participant (participant characteristic); matching said at least one participant characteristic with at least one market research instrument; integrating said market research instrument with a computerized training course (integrated market/training study); presenting said integrated market/training study to said participant.

Another embodiment of the invention comprises a computer readable medium having computer executable instructions for identifying matches between participants and market research instruments comprising obtaining a profile associated with a participant (participant profile); matching said participant profile to at least one market research instrument; integrating said market research instrument with a training course (integrated training study) wherein said integrated training study is presented to said participant over an electronic device. A profile may comprise one or more participant characteristics that are of a demographic, professional, or personal nature. Such a profile defines the potential participant and allows the software to determine whether the potential participant is a good match for a given market research instrument according to predetermined market research rules. The training study may be presented over an electronic device which includes a computer, a terminal, a personal digital assistant, a cellular phone, or any computerized/electronic device capable of having a training course electronically embedded in the instrument or fed to the instrument by any variety of networked communications including the Internet and wireless communications.

Another embodiment of the invention comprises a computer readable medium having computer executable instructions for identifying matches between participants and market research instruments comprising obtaining a profile associated with a potential participant (participant profile); determining whether said participant profile qualifies for at least one market research instrument; integrating said market research instrument with an electronic training course (integrated electronic study); presenting said integrated electronic study to said participant whose associated participant profile qualifies for said market research instrument (qualified participant); repeating said obtaining step through said repeating step for a market study until a predetermined sample of said qualified participants have responded. The determining step involves comparing the participant profile against a target profile to determine whether, according to predefined business rules, enough correspondence exists between the two profiles such that the participant profile fulfills a predetermined model of criteria to make completion of the market research instrument by this participant of adequate value to the market researcher. Market studies may focus on a predetermined sample of the population or a predetermined breakdown of the population to ensure an unbiased result.

A computer readable medium having computer executable instructions for identifying matches between participants and market research instruments comprising obtaining a profile associated with a potential participant (participant profile) in an electronic training course; determining whether said participant profile qualifies for association with at least one market research instrument; integrating said market research instrument for which said participant profile qualifies (qualifying participant profile) with said electronic training course; presenting said integrated electronic training course and market research instrument to said participant associated with said qualifying participant profile (qualifying participant); monitoring said qualifying participant's progress through said integrated electronic training course and market research instrument; storing a history associated with said qualifying participant's progress through said integrated electronic training course and market research instrument; allowing said qualifying participant to exit said integrated electronic training course and market research instrument and re-enter said integrated electronic training course and market research instrument at a point in said integrated electronic training course and market research instrument associated with said qualifying participant's exit from said integrated electronic training course and market research instrument. An electronic training course may comprise any accredited or non-accredited training course that is transmitted to the participant via an electronic or computerized medium. Such training course may include continuing education (including specialized continuing education such as CME—continuing medical education—or. CLE—continuing legal education—or other professional educational studies, scholastic education at the elementary, high school, or collegiate level, on-line distance learning, product tutorial and more). A history stored regarding the participant's progress through the market research instrument and the educational tool may include a video or slide show of the portions of the study viewed thus far, a recordation of prompted answers to questions throughout the study, or other means for recording how much the user has completed so that the study may re-enter at that point and the user will not have to needlessly duplicate portions of the study.

A computer readable medium having computer executable instructions for identifying matches between participants and market research instruments comprising obtaining a profile associated with a user of an electronic device (user profile); selecting at least one market research instrument for which said user associated with said user profile qualifies (qualified user); embedding said market research instrument in an electronic training course associated with said electronic device (integrated tutorial); presenting said integrated tutorial to said qualified user.

A computer readable medium having computer executable instructions for performing a method comprising creating a profile associated with a participant (participant profile) in an electronic training course from a registration form associated with said training course; maintaining a database comprising a plurality of market research instruments directed to a plurality of market venues; maintaining a database of at least one target profile wherein each of said at least one target profile is associated with one or more of said market research instruments; comparing said participant profile against said target profiles; selecting a target profile sufficiently corresponding to said participant profile; integrating one or more of said market research instruments associated with said target profile in said electronic training course; presenting said integrated electronic training course and market research instrument to said participant associated with said participant profile corresponding to said target profile.

A computer readable medium having computer executable instructions for identifying matches between participants and market research instruments comprising creating a profile associated with a participant (participant profile) in an electronic training course from a registration form associated with said training course; supplementing said participant profile with at least one item of information included in a professional membership database associated with said participant by accessing said professional membership database; selecting at least one market research instrument corresponding to said participant profile; integrating said market research instrument into said electronic training course; presenting said integrated market research instrument and electronic training course to said participant.

DETAILED DESCRIPTION OF THE EMBODIMENTS OF THE INVENTION

One embodiment of the present invention uses the information needed to provide a continuing education course as a basis for electronically identifying and qualifying the individual for available marketing research studies. This embodiment matches a study to the individual and other characteristics, and presents the instrument of the marketing research study in relation to the continuing education course. This embodiment furthermore applies continuing education as an incentive mechanism for market research. This embodiment presents market research studies within a continuing education venue. This embodiment provides a mechanism and data packet format for transmission of evidence that an individual has successfully completed a continuing education course on-line.

Figure 1:
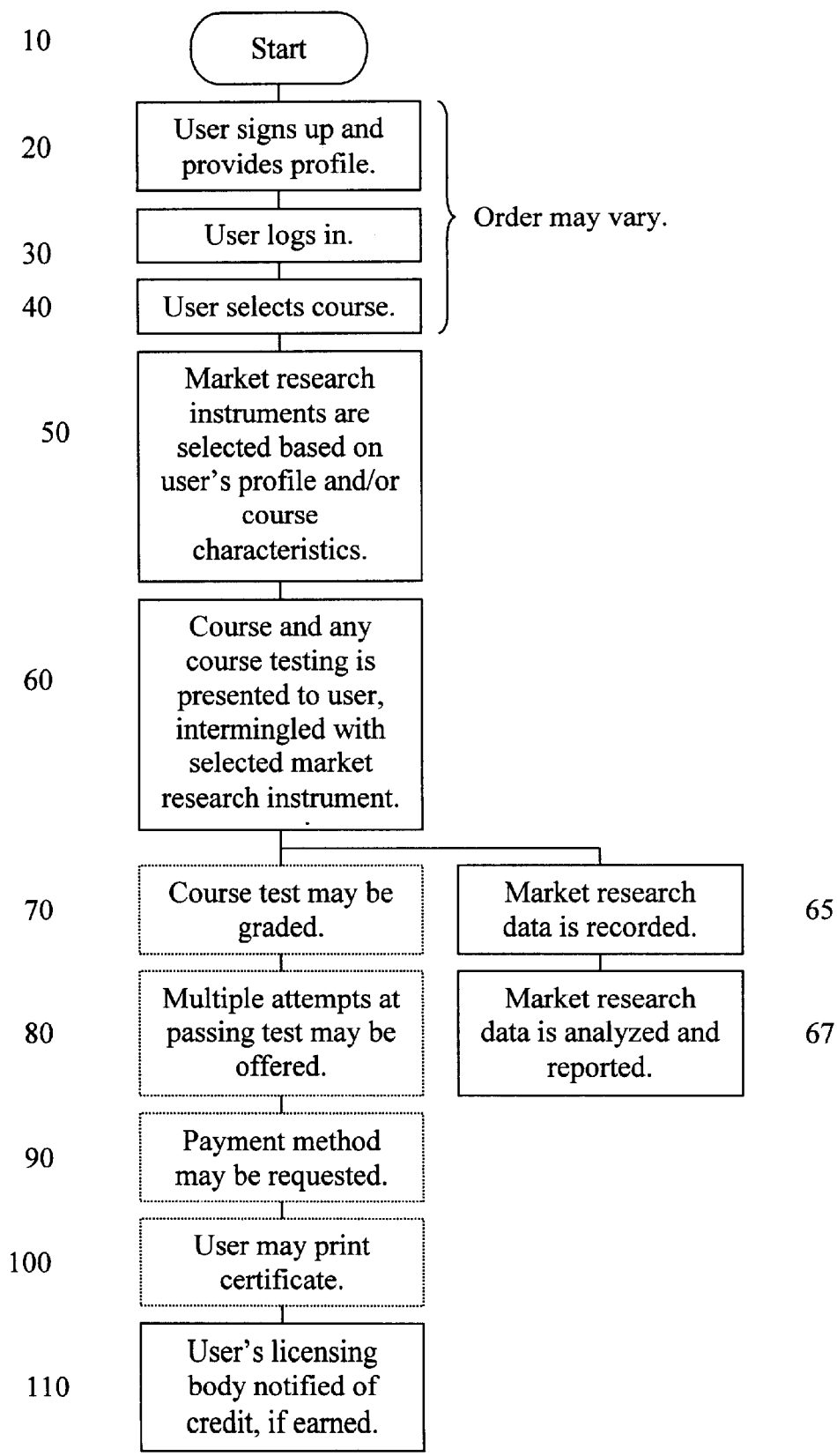
FIG. 1 describes the flow of information in one embodiment of the invention. In this embodiment, the user characteristics are known before the market research instrument is selected.

In another embodiment, for an individual to obtain continuing education credits, the provider of the continuing education course may obtain the identity of the individual and the course the individual intends to take. As shown in FIG. 1, the individual, called the user, may provide a profile that includes his or her identity (20). Additional information may be required to create a richer profile of the user. In the present state of the art on the Internet, the user types this information into a form on the provider's site, although other media may allow different methods of identifying the individual. Identification may be remembered by the user's computer for automatic identification at a later session; currently, this is done through use of "cookies". User may select the course (40) first, or sign up (20) first. Signing up includes providing a profile that includes various professional demographics and other qualification characteristics (described below).

As information about an individual becomes more invisibly embedded in the communication systems (e.g. the individual's computer, television, phone, service provider), the individual may not overtly or purposefully provide the information, yet the communication system does this automatically. In other words, electronic identifiers may be present in the communication system of the user. Currently, the most common identifiers are cookies, telephone numbers and IP addresses. Identification may also being done via systems that use biological or physiological methods in more sophisticated systems.

Users may also be identified through a previous interaction, such as signing up with a site, registering a product, or making a purchase on the site. This information, in some systems, may be kept to recognize the user in the event that he or she may subsequently use an educational service provided by the site.

For example, a software manufacturer may offer an on-line certification course for their product or the application of their products, wherein the user gains a professional credential. An individual chooses to take this course. The software manufacturer may have already recognized the individual as a previously registered user for another service, such as product registration or news services. In this embodiment, the manufacturer could use that previously provided information to identify the user for the course purposes, and also uses this information or other qualifying characteristics to conduct a market research study. The manufacturer may locate the market research study temporally or physically proximal to the course in order to obtain the benefits described in the various embodiments of the invention. The manufacturer may also reward participation in the study by offering the course at a certain price level, such as discounted or for free. The manufacturer could use the information needed to record the individual's subscription or completion of the course to aid in identifying or qualifying the individual for a market research study.

In another example, a hospital department manager requests that everyone in her department be trained on a new product. The training may be provided online or with a disc. Knowing the department, type of work, and product usage of the individuals in this department, they are qualified to participate in a market research study (perhaps sponsored by the new product's manufacturer). Specific identification of the individuals is not necessary in this case, yet all receive the professional benefit of meeting their training obligation to their department manager.

One benefit to the various embodiments of this system is that users deliberately choose to participate in an educational program and, in doing so, provide or evoke some information that puts them in consideration for a market research study.

Another embodiment allows groups of individuals to interact with it, thereby allowing alternative formats of the continuing education course, and allowing alternative marketing research instruments, techniques and tools to be used in the marketing research study. For example, group or panel techniques could be employed, either electronically, partially electronically; or non-electronically but with input into an embodiment of the invention.

A further method of identification of the individual may be done by credit card verification. In one embodiment of the invention, the users are requested to provide valid credit card information as a method of assuring that the individual is honestly representing his identity. The credit card identification may occur by way of payment for a continuing education course, or may be verified without any payment by the individual occurring. Accurate identification of the individual is beneficial in that course providers are concerned that the individual receiving the continuing education is the same as the individual taking the course; market researchers are also concerned that the respondent and his or her characteristics are accurately portrayed.

In another embodiment, the user chooses the continuing education course that he or she wishes to take (40). This choice may occur by choosing from a list or menu of courses, or by otherwise locating the desired course. If the user is not already identified by the provider's site, then the user may be prompted for his or her identity/profile before proceeding.

In another embodiment, the identification of the individual is done by drawing upon data collected at a partner's website (e.g., another on-line continuing education provider or a manufacturer's website). Users may then be prompted for additional identification information or qualification characteristics should the information provided by the partnering website be insufficient for the needs of the marketing research study.

In another embodiment, the identification of the individual is drawn from an existing database, such as a class roster, a professional organization's member list, or other list made available to an embodiment of the invention. The database may provide additional information about the user, may simplify the user's sign-up tasks, may confirm that the user is part of a particular group, or may be used to confirm the individual's identity.

Market researchers may use external methods to verify the identity of an individual that was found via one of the methods. The verification step is desirable in extensive, in-depth studies, or where confirming the identity is important for selection or security reasons.

By supplying his or her identity, the user supplies characteristics by which an embodiment of the invention may determine qualities of the user for entry into a known market research study. Identity is not the sole or even a necessary characteristic. Characteristics of an individual user may be collected by requesting the information from the user, obtaining the data from a third-party database, or a combination of the two. Once collected, the user's identity and/or other characteristics may be recorded to a database (65, 260). Referencing this data to existing databases (e.g. professional organization membership lists, phonebooks, etc.) can reveal other characteristics about the individual that may be desirable in selecting and screening respondents for a marketing research study, such as demographic information, employment characteristics, and professional history. Depending on the requirements of the marketing research study, one or more characteristics about the user, his or her behavior, the course, or the venue may be compared to one or more selection criteria for a marketing research study. The mechanism is discussed below. The characteristics that may be used can include:

1. Professional registrations and certifications
2. Professional registry and certificate numbers
3. Professional affiliations
4. Work environment and specialties
5. Work related equipment operations
6. Professional title or Supervisory status
7. The professional credentials of the on-line user(s)
8. The professional responsibilities, job title or supervisory duties of the on-line user(s)
9. The purchasing authority of the on-line user(s)
10. The professional membership of the on-line user(s).
11. The years of experience, years of work in the professional field, or age of the user(s)
12. The size of the employer of the user(s), or of the user's business or departmental unit within that employer
13. The products or services utilized by the employer of the user(s), or of the user's business or departmental unit within that employer
14. The technologies, services or products utilized by the user(s) in the course of their professional duties
15. The group purchasing agreements associated with the user's employer
16. The salary of the user(s)
17. The geographic location of the user(s)
18. The gender of the user(s)
19. The language or nationality of the user(s)
20. The computer hardware of the user(s)
21. The computer software of the user(s)
22. The ability, propensity or technical resource of the user(s) to utilize the internet
23. The location (e.g. internet site) where the course of training is made available to the user(s)
24. User's identified purchasing behavioral characteristics (e.g. early adopter, etc.)
25. The user identification characteristics used by the Internet site where the course of training is offered.
26. The internet browsing history of the user, available for review by the matching and appropriate software
27. The user identification characteristics used by other Internet sites that appear on the user's computer and are available for review by the matching and appropriate software.
28. Specific scope or content of the course of training
29. The profession of the intended audience for the course of training
30. The professional specialty of the intended audience for the course of training.
31. The technology discussed in the training materials
32. The application of the equipment or technology discussed in the training materials.
33. The specific professional applications for the ideas, actions or techniques, described in the course of training
34. The products or services offered at the Internet site, where the course of training is offered.
35. Coupons, tokens, credits, product serial numbers, launching disk (e.g. CD), e-mailed link, or promotional devices used to bring the user to the site or to a specific CE or to a specific MR
36. Purchaser of the CE credit.
37. Products etc. whose purchase or usage characteristics correlate to something
38. Time and date of previous studies where the user was a respondent.
39. Time and date of the last visit by the user.
40. Current time and date
41. The Internet site or computerized venue where the course is being offered.
42. A hardware, software or information identifier used by a connectivity service provider (e.g. wireless, cable or internet service provider) to identify the account of the user.

43. User identifier defined by a previous transaction or exchange with the user.
44. Application used to launch or present the course or the market research study Other characteristics are more applicable to distance learning or educational methods other than professional continuing education:

45. Age
46. Gender
47. Grade level (e.g. 7th, sophomore, grad school)
48. Years of education
49. Expected course grade
50. Major or minor field of study
51. College, school or institution presenting the course
52. College, school or institution where the course being presented
53. Class rank
54. Extracurricular activity involvements, including sports
55. Grade point average or expected grade in the class
56. Level or type of financial aid
57. Divulged purchasing characteristics or behaviors
58. Housing characteristics
59. Student full-time or part-time status, including course load
60. Commuter student status
61. Expected graduation date
62. Occupation or other employment
63. Family characteristics and background
64. Income level
65. Key possessions (e.g. car, computer, MP3 player)
66. Other personal demographics, (e.g. ethnicity)
67. Other student demographics, (e.g. honor student)
68. Other social demographics, (e.g. rural location)
69. Other economic demographics, (e.g. savings or debt level)

Figure 2:
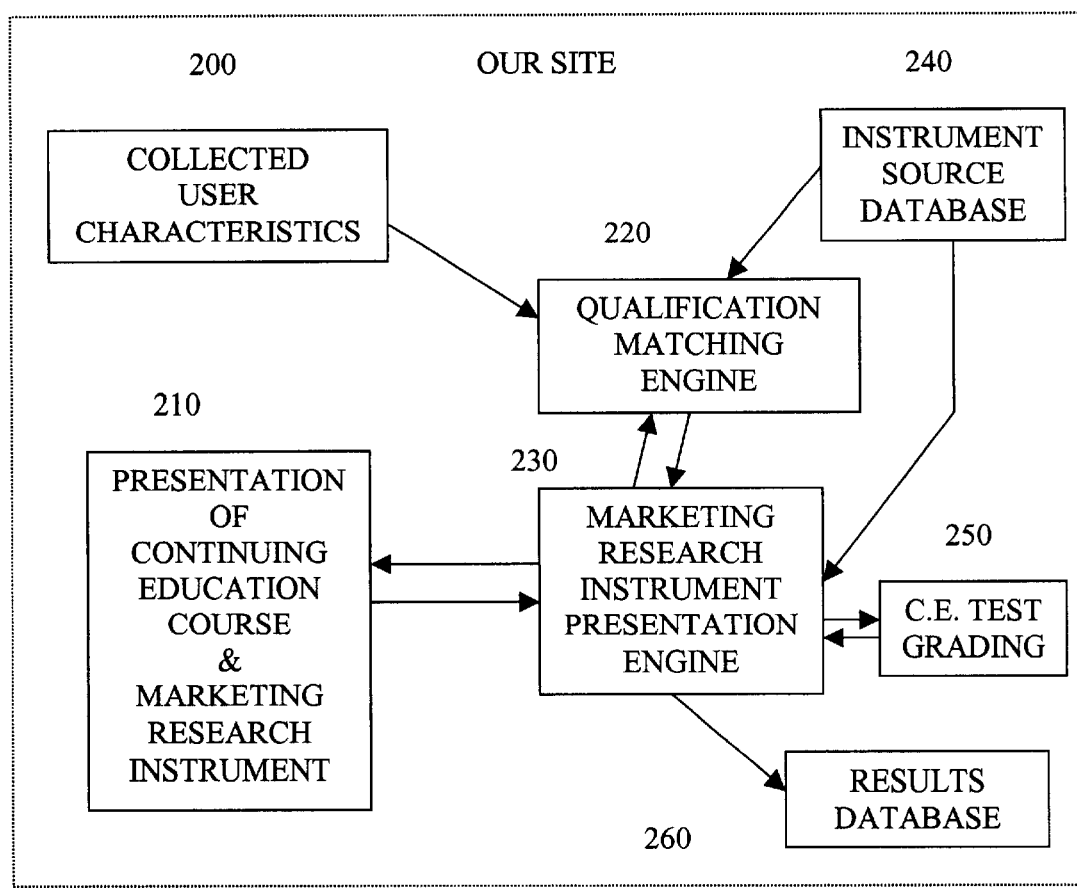
FIG. 2 describes the relation of the mechanisms and databases in an embodiment of the invention.
Figure 3:
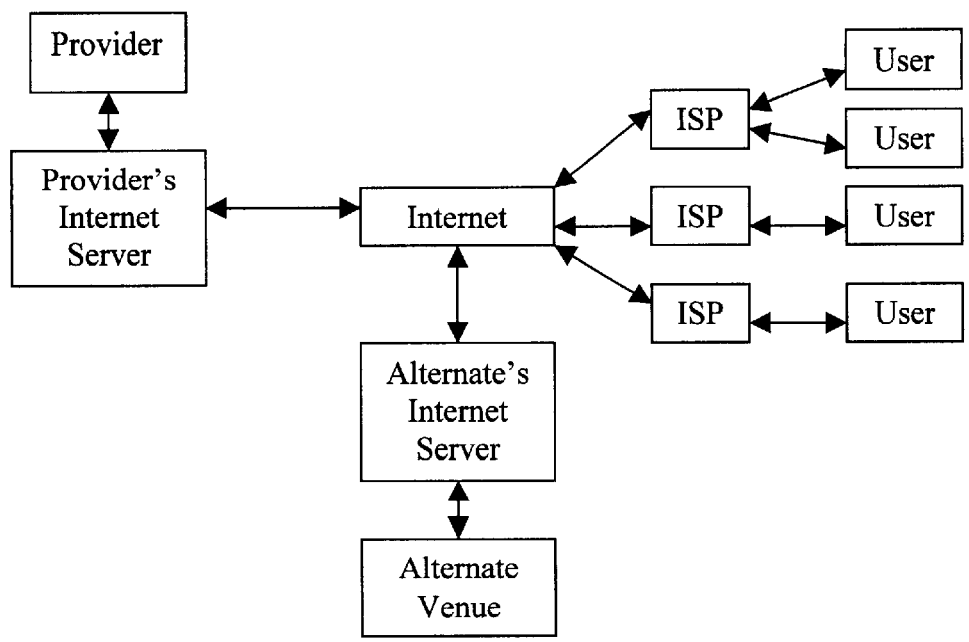
FIG. 3 describes the general nature of the Internet and generic electronic networks for which various embodiments of this invention are highly applicable.

Referring to FIG. 2, a software program or qualification engine (220) can match or select users for specific studies based on the qualification criteria (240) for the marketing research study. The qualification criteria take the form of conditions used by the qualification engine (220) that correspond to the qualification characteristics (240). For example, a qualification criterion may be that the years of experience of the prospective respondent be greater than 5 years. These are also referred to as selection criteria, recruitment criteria, or screeners. Qualification or selection of a user for a marketing research study typically indicates that the user is a member of the population or audience that the researcher wishes to study, or at least meets the ostensible criteria for study sample.

The qualification engine (220) is a program that compares the known qualification characteristics of the user (200), the course, the venue, and the session to the qualification criteria of the available marketing research studies (240). The engine (220) reviews the available market research instruments (240) for qualifying characteristics that match, or most closely match, those of the user. Other filtering criteria, such as the priority of the instrument, the number of participants still needed, or the computer system capabilities of the user, may also be used for selection. The range and weighting of the sample for each marketing research study also determines if an individual meets the qualification requirements for the study. Various mechanisms and algorithms known to those skilled in the art will perform this comparison, and can be chosen based on speed, type of software platform and language, and complexity of the data and conditions. The output of the qualification engine may be a choice of the available instrument(s) that will be presented to the user. Second or third choices may also be noted, should the user need to respond to additional qualification criteria, as described below. This information is conveyed to the presentation engine (described below), which organizes and presents the continuing education course and marketing research instrument to the user.

Figure 5:
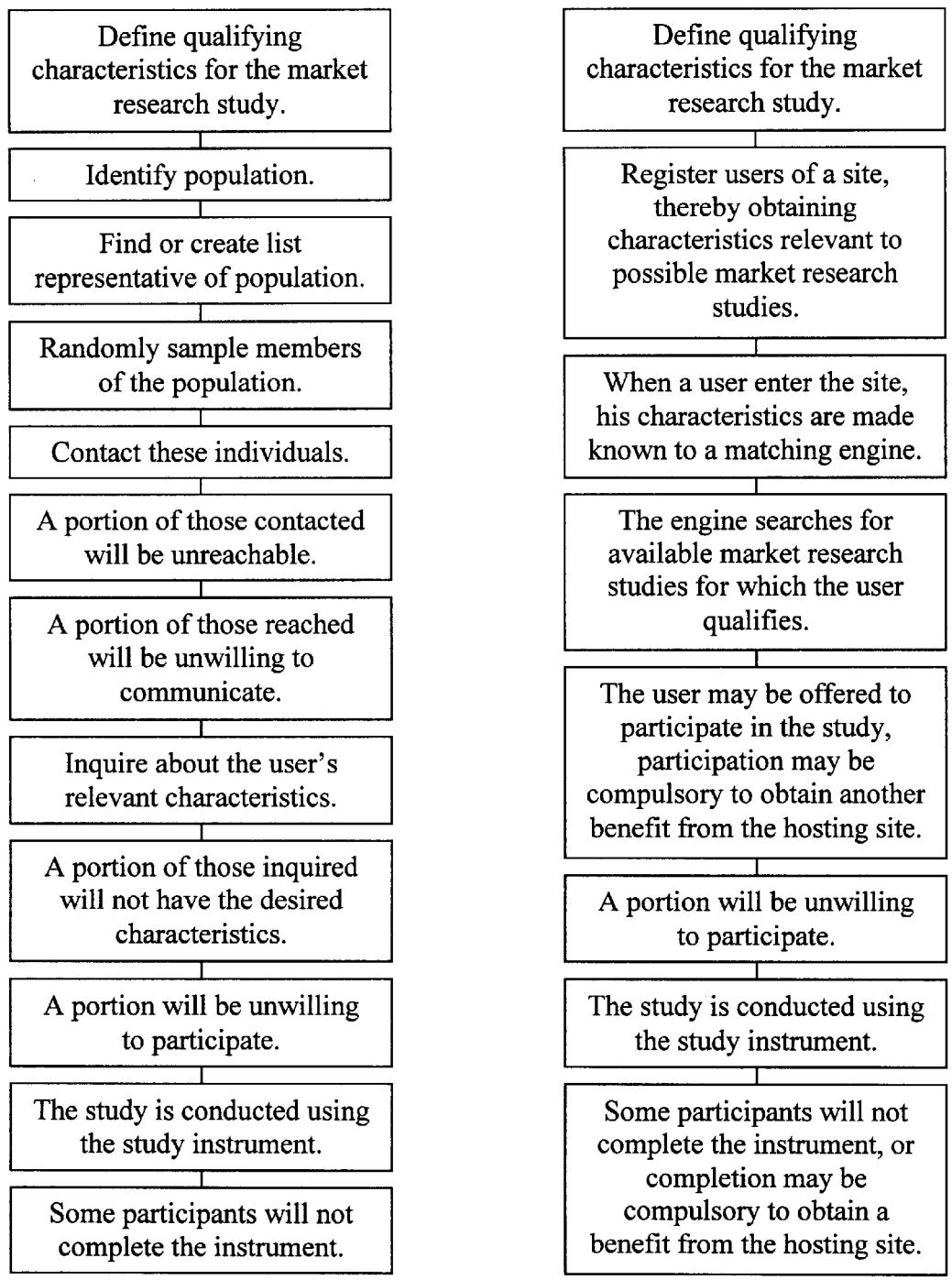
FIG. 5 compares the recruitment and selection methods used in various embodiments of the invention with the traditional recruitment and selection methods used in market research.

This method of matching market research studies to prospective respondents is desirable insofar as it does not waste a potential respondent when one is available. Current methods of locating respective respondents can be time-consuming and costly, as illustrated by the numerous steps in the common method, shown in FIG. 5. In the traditional method, several junctures exist where the number of users who could potentially answer questions could be diminished. In effect, individuals who are willing to do market research are wasted because they do not qualify for the single, particular study at hand. Although these disqualified users may have qualified for another study, they are never considered for them through the traditional method. In one embodiment of the invention, the study may continue until the desired sample size is obtained, whereas a traditional method must rely on estimates of response rates.

In the selection method described in this embodiment, referred to as the reverse selection method, the pseudo-randomness of site visitation provides the mechanism by which random respondents are located. The advantage of this embodiment is that every user of continuing education who is willing to do market research can be used by matching them to an appropriate study. Waste of willing respondents is minimized. In Nth visitor and self-selection techniques, only a portion of the viable users may actually take a market research study as they, again, may only be considered for a single, particular study at a given time.

Where there may be a limited number of market research instruments from which to choose (e.g. one), selecting or matching a particular instrument to the participant may be relatively easy. Qualification for the market research may include any participant characteristics, course characteristics, venue characteristics, or situational characteristics. In its simplest form, interest in the continuing education course, its subject or its provider may be sufficient qualification for the market research study. For example, a producer of medical or pharmaceutical products may place a continuing education course on the Internet, and may request certain market research information as part of participating in or earning credit for that course. This producer may have minimal qualification criteria for the market research study or instrument, such as allowing any user of their continuing education credit to participate in a survey or questionnaire, recognizing that such an instrument may have a specific and limited market research purpose.

While the known characteristics of the user, the course, etc. may initially take the first cut at qualifying the users for marketing research studies, more specific criteria may be needed for some studies that fall beyond the existing list of qualification characteristics and criteria. In such cases, an additional qualification criterion may be presented to the user in the form of a question or a choice (i.e.: a self-selection question). In responding, the user lets the qualification engine know if he or she is fully qualified for the prospective study. If so, the study can proceed. If not, a new marketing research study will be presented to the user. This method allows customization of the qualification variables on an individual study or instrument basis.

Longitudinal and other time-interval marketing research studies track an individual or group of individuals over a period of time, primarily to examine time- or event-related changes, patterns or trends. In one embodiment of the invention, specific users may be remembered by the system as being selected for such a study, whereupon the qualification engine may preferentially choose to present the individual with a subsequent phase of the longitudinal study over another study for which the user is qualified. This method is particularly useful in gauging the effect of a marketing tool, such as a continuing education course or an advertisement, on the respondent in order to better understand the return on investment of the marketing tool.

If the qualification engine cannot find an appropriate match of the user's qualification characteristics and the qualification criteria of the available marketing research studies, the engine may select or choose not to present the user with a study. However, other studies, such as a usability evaluation of the website or other surveys of the user, that have minimal criteria if any, may be presented. In addition, for users for whom no market research study may match, the user may be subject to a general survey that has no external client, such as a survey for the course provider or the market research firm.

Another embodiment of the invention may continue to present the study until a desired number of a sample are obtained. These samples may be stratified by any of the above qualifying characteristics. For example, a study may require 300 respondents to be physicians, where 100 shall be radiologists, 100 shall be cardiologists, and 100 shall be cardiothoracic surgeons. In this embodiment, the study shall continue to be applied to at least a portion of the radiologists, cardiologists and cardiothoracic surgeons until the desired number of respondents have successfully completed the study. Alternatively, the study may continue until a statistic derived from their responses has reached a certain confidence level or statistical power. A third method is for this embodiment to seek a targeted volume of a demographic, representative for the study at hand. This embodiment will continue to present a market research study until the distribution of respondents corresponds to a target demographic table, or, alternatively, preferentially select individuals with particular demographics in order to continuously aim toward this target demographic table. Such a method is useful in assuring that all required geographies or age/experience brackets are sufficiently sampled in the study.

Historical information on the visitation rate of the types of users can facilitate business planning and quoting. Knowing how frequently an individual meeting certain qualification characteristics typically shows up and is available for market research allows the surveyors to predict how quickly a market research study can be conducted. This information further allows an automated tool to provide cost estimates to a firm, or to-provide a quote to prospective clients of the firm.

Referring to FIG. 2, the presentation engine (230) combines the continuing education course and the marketing research study. In one embodiment, this means merging them into a series of web pages. The order in which the market research instrument is presented in relation to the continuing education course may vary. Depending on the characteristics of the course or the instrument, the instrument may be presented before, after, intermingled in, or as part of the course (210). For example, questions of the instrument may be answered before the course is started, or selected, if the course selection is not a criterion for selection of the instrument. Instrument questions may be presented at the end of the course, again before, after, or intermingled with any course test questions. The placement and integration of the market research instrument in relation to the continuing education course depends on the media and nature of the course and of the instrument.

Other methods of coupling a market research study with a continuing education service exist. For example, potential respondents may be e-mailed surveys that include a coupon or code for a free or discounted continuing education course at a designated web site. In another example, the market research studies take the place of commercial breaks for educational programs, wherein the one-way monologue of a commercial is replaced by a feedback or dialogue mechanism of a market research study.

Figure 4:
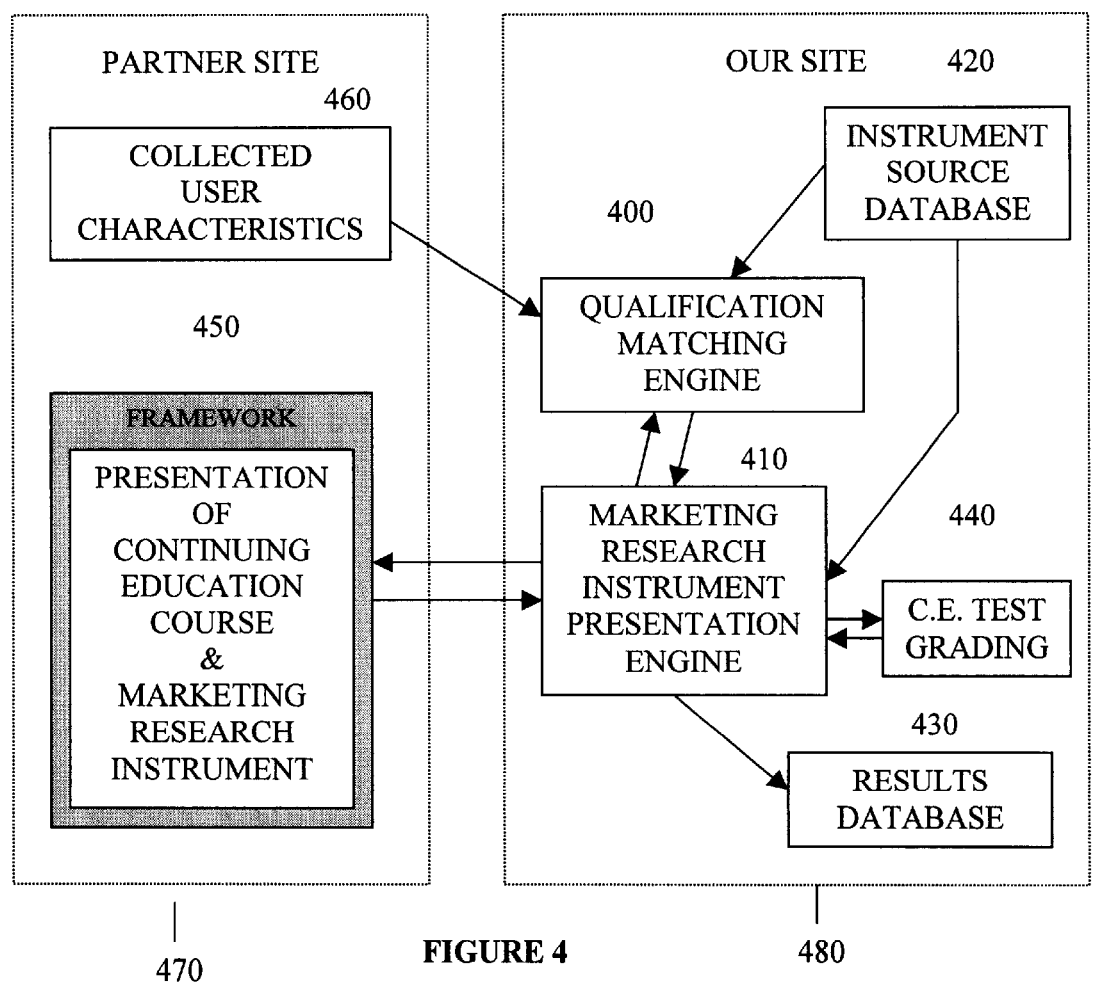
FIG. 4 describes the an embodiment of the invention where the continuing education and market research is presented in another venue (or site) aside from that of the service.

Referring to FIG. 4, in another embodiment, the course and the market research instrument are presented on a website or equivalent venue controlled or contacted by the provider of the service (450, 470). In other embodiments, the course and the market research instrument may appear on the site or equivalent venue of the:

Market research client's site

Continuing education course author

Continuing education course owner or sponsor

A distance learning school

Another continuing education provider

Other third-party site (e.g. market research company or venue)

These other venues may provide the continuing education venue in exchange for market research about their site and users, for a fee, or for revenue-sharing of the market research study. Multiple continuing education venues may be used to provide a larger, more varied, and more representative population of users for which market research studies may be applied. The ability to add another continuing education venue at which one can perform market research may be accomplished by way of a "plug-in" provided by the inventor's firm, or by establishing a set format for user characteristics and including code in the venue's site that contacts the matching engine (400), as shown in FIG. 4.

The course and the market research instrument may not be provided out of the same location. Due to the nature of the Internet and related networks, it is unimportant where the content is stored. Likewise, it is unimportant where the software that selects or provides the market research instrument or the continuing education course is located. Some software-based services used to provide a market research tool (e.g. a conjoint package) or a continuing education course (e.g., a video webcast service) may be located at another location due to the prohibitive cost and technical capabilities needed to administer or provide the service.

Included in the scope of presenting the course is presentation of any tests or other course-related questions. Course-related questions should not be confused with marketing research instruments. Course-related questions are used by the course provider to verify comprehension and completion of course material. In some cases, they may be used to navigate through a course, particularly where courses may take multiple paths, such as in simulated scenarios. Course-related questions may appear anywhere in the course, including at the beginning and at the end. These questions may be graded, and a satisfactory grade may be required for acceptable completion of (i.e. passing) the course (440). Users may be given multiple chances to pass a course, with varying levels of feedback, from no feedback to review of the missed question's topic. Limitations may be placed on the number of attempts. The actual answers may be recorded and reported for issuance of credit (see below), and may be reported in relation to the marketing research study in some cases.

Also included in presentation of the course are prompts to the user for feedback as to the quality, currency, and value of the course. This information may be used as a management tool for the provider, and to provide sorted lists to potential users to facilitate course selection, thereby providing a quality control mechanism.

In cases where the user must pay for the continuing education course, the course presentation may be finalized with a request for payment. This may be done electronically using credit card payment systems, previously earned or given "store credits" or coupons, or through participating in additional marketing research. As noted above, credit card payment may be used as a method of identity verification to the licensing bodies. In one embodiment, payments are made after the user has completed the course. At the time of payment, qualified users may be asked if they would like to discount or eliminate the payment in exchange for performing a market research study, in addition to any in which they may or may not have already participated. This offer is particularly desirable as it occurs at the moment where users must provide payment, and may be sensitive to cost savings. Furthermore, this embodiment will have a record of any previous market research studies this user has done, and can avoid giving the offer to a user who gives incomplete responses or may have already been influenced by another, related study. Users may also purchase subscription plans or blocks of credit hours ahead of time. For some users, an organization may pay for the continuing education course for them, such as their employer or a company seeking to obtain the user's opinion and business.

One technically simple yet desirable feature of one embodiment of the invention would be to recall the user's place and level of completion in the midst of a course or in the market research. One way to accomplish this is to record the viewing history or response history of the user to a database that can be re-interpreted by this embodiment of the invention upon return of the user to the site. This allows the user to complete a course or a market research study in discontinuous time periods or from different computers. For video or audio media, this feature may be embodied as play, pause, stop, or place-marking controls. To allow for the possibility of multiple individuals using the same computer, log on and log off features, or an option to change the current user, is used.

In some market research studies, confidentiality agreements may be desirable from the respondents. Legally binding electronic signatures may be used for an on-line electronic agreement, or an additional step of mailing or faxing the agreement to the potential respondent may be necessary.

Referring to FIG. 1, responses to the marketing research instruments may be recorded to a database for subsequent analysis using the tools and techniques of marketing research science (67).

The ability to monitor the collection of data is important in assuring that the expectations of the marketing researcher are accurate. In the preferred embodiment, the answers may be viewed using secure electronic means by the marketing researchers. Clients paying for the market research studies or the researchers themselves can view the responses as a method of monitoring the quality and speed of the study. Automated reports may be generated or sent via e-mail to the marketing researchers as a method of facilitating this monitoring.

Participating in a market research study may also be used to at least partially pay for a continuing education course. As continuing education courses are often purchased by the user, whether as a product or as an education service, payment for these courses may be in the form of participating in a market research study.

The provider of this service may choose among several methods of how this payment may occur. First, upon request for payment for the course, the user may be offered to participate in a market research study rather than submit payment, or as a discount to a payment. In some cases, the discount may be offered repeatedly for participation in additional or extended market research studies. Second, the user may earn "store credits" for continuing education courses by participating in market research studies. Third, continuing education courses may be offered at a discounted price or free for those participating in market research studies, where the instrument of the study is attached to the continuing education course as described elsewhere in this section.

Group agreements may be formed between the firm and other organizations to provide discounted continuing education in exchange for access to the organization's data or members. For example, a hospital may be offered free continuing education in exchange for access to information about its procedures and access to performing market research within the hospital's own computer network (e.g. a hospital intranet).

The price level of continuing education courses may vary with profession. Likewise, the incentive, discount, or honoraria for a given user may vary based on the difficulty of obtaining a particular type of individual and on their usefulness and demand in the market research arena.

Continuing education credit is earned upon completion of the course requirements. The credit itself is conferred by the licensing body or association of the user. Different licensing bodies have different requirements for how evidence is to be presented to them, and therefore the provider of the continuing education course may notify the licensing body via hard copy, e-mail, data interchange, or other form of communication. Reporting may occur for each individual, or may occur for a group of individuals (110). In one embodiment of this invention, the completion evidence is written to a database denoting the individual's identity. Completion evidence may include the time spent on the course, the grades of the test, or the answers for the test. This evidence is then reported to the licensing body as appropriate to that body's requirements. Users may be given the option to print out a certificate, should the user have the necessary hardware. This hardcopy certificate may be useful to the user in providing evidence of course completion, as some licensing bodies or employers may require printed evidence.

The provider of this service may determine on an individual basis if participation in the market research study is required in order to earn the continuing education credit, or if valid and complete participation in the study is required to earn the credit. Often, such decisions are based on the needs of the study. The administrative software or engine may be configured in such a way as to allow this decision to be made for a particular study, or if reasonable, a particular continuing education course.

Issuing continuing education credit only upon valid participation in the market research instrument is most desirable, as complete responses are preferred. However, the marketing research instrument may be presented after the credit has been issued, or in a similar manner so that participation in the market research is voluntary.

Accreditation by a licensing body is not essential for this method to provide educational information of value to a user. Continuing education courses that are not accredited by the user's licensing body or that may not have application for the user's continuing education requirements may be used. For example, a certificate of completion that may be available from the provider may be sufficient motivation to encourage the user to be a participant in a market research study.

Communication that an individual has earned credit for a course may be done electronically. The method of transmission may be an electronic data packet, a specifically formatted e-mail, or a file or packet attached to an e-mail. The information contained in the packet must be sufficient for an accrediting body to at least identify the individual and the amount of credit hours earned. Additional information may include:

1. Name of the course,
2. Subject of the course,
3. Course provider (e.g. the site or the school),
4. Class, section, or instructor through which the course is provided,
5. Course author,
6. Course accreditation,
7. Type of credit earned by the course (e.g. Type A versus Type B),
8. Address of the individual,
9. Phone number of the individual,
10. E-mail of the individual,
11. Network electronic identifier of the individual,
12. Employer of the individual,
13. Job title of the individual,
14. License or membership number of the individual,
15. State of licensure, and
16. Amount and method of payment for the course.

Other incentives for marketing research participation: While the continuing education course may be the initial or primary incentive to participate in marketing research studies, other incentives may be offered as means of encouraging users to participate in larger, more complex, extensions, or on-going studies. These may include cash payments via electronic fund transfer, debiting credit cards, checks, cyber-cash (e.g. exchange systems devised for replacing cash and other payments methods for on-line transactions), professional goods, discounts on outside products, coupons for outside products, entries into a drawing or contest, or other goods and services of probable value to the target audience.

Use of user information for other methods of marketing research: The continuing education courses may be an incentive to provide information about the user that would select them for external research studies. The eligibility, sign-up, previous use, or intention to use the continuing education service may provide identification, demographics, and other information that is useful in selecting individuals for other formats of marketing research studies. Such studies may be external to the web site or even the provider of the web site, such as in-person interviews, usability tests, phone interviews, and other non-Internet study formats. For example, a user may be offered a partial or full discount in payment of a CE course in exchange for volunteering to participate in a phone survey.

Conveyance of information over computer networks currently works most quickly with text-based media, although sound and video will become sufficiently rich and quick with foreseeable technological and network infrastructure advances. The format and media of both continuing education courses and market research studies will likewise evolve to take advantage of any more commonly accepted media. The method of using the information needed to provide a continuing education course as a basis for electronically qualifying the individual for a market research study is not dependent on the size or power of the information appliance, computer, network, or bandwidth, nor is it dependent on whether these courses and studies are presented in richer media formats, such as video or sound. It is similarly unimportant if such media are recorded, streaming, time-delayed or live. The embodiment functions with either real-time (e.g. streaming or broadcast) or pre-programmed (e.g. recordings, files or pages) presentations of a course. Similarly, the market research mechanism can be preprogrammed, live, or interactive. The level of interactivity can range from static surveys to automated questioning devices and adaptive programs to human interviewers or moderators interacting with the respondent. These mechanisms can be applied to text, graphic, audio, and video media and electronic simulations.

As phone and television technologies become more integrated with the Internet, the distinction between these information exchange mechanisms becomes less apparent. Even in the current embodiment, the market research aspects may be performed via phone technologies, wherein the respondent may be contacted via phone or net-phone by automated or human interviewers or moderators who can verbally interact with the respondent. Likewise, interactive television and videophones will allow similar interaction. In one example of this embodiment, a user participating in our continuing education services may be prompted with an offer to participate in a market research study where an interviewer will phone them immediately or at a specified time to conduct the research.

Similarly, embedded communications technology, such as wireless communications and the inexpensive integration of computer-like monitoring functions into electronic devices and products, will allow administration of market research instruments on that device, even while the operator of such devices participates in evaluation or training on the device or product. In one embodiment, a user participating in training for how to operate a device may be prompted on the device's user interface (control screen) to evaluate ease of usage of the device, to indicate their preferences, or asked their understanding of the next step in it's operation.

The terms "site" and "internet" are the current and commonly used terms for the present state of technology. A site, with respect to this embodiment of the invention, can similarly refer to a channel, venue or locale on an electronic communication system. The internet is the current state of a geographically-large, computerized network that allows transmission of information and media, and, with respect to this embodiment of the invention, can similarly refer to an interactive television or other electronic communication system, including communications capabilities integrated into electronic device products themselves.

The various embodiments of the invention provide several advantages over other types of market research. Compared to each of the nine general types of internet-based market research, the various embodiments of the invention have distinct and unique advantages.

Compared to Nth visitor techniques on the web site, the various embodiments of the invention use more targeted and specific selection criteria. Some qualification of the individual may be done before the offer to participate is made, whereas Nth visitor techniques are often self-selecting, with associated biases.

Nth visitor techniques are frequently intrusive (e.g. pop-up windows).

Furthermore, N−1 visitors are not considered for participation, making the method inefficient. However, an embodiment of the invention may be coupled with an nth visitor mechanism, where only the nth individual of a certain qualification is invited to participate in a market research study.

Selection through other media or communication methods removes many of the speed benefits associated with Internet market research. In these methods, selection, recruitment and qualification are done manually. Contacting by phone, mail, and fax often has low response rates. When requesting a respondent to visit a web site via one of these contact methods, the likelihood can be small that the respondent actually visits the desired web site in order to participate in the study. In the various embodiments of the invention, the selection, recruitment and qualification are done quickly and in an automated form. Furthermore, the market research instrument is presented at a time when the potential respondent may participate with minimal effort, thereby increasing the response rate. Recruiting and inviting individuals to participate in a study via e-mail is often undesirable because e-mail addresses can change easily and therefore may not be up to date, and because unsolicited e-mails are often viewed negatively (i.e. "Spam") by potential respondents. The various embodiments of the invention do not depend upon e-mails for initial selection and recruitment, yet may use them for follow-up purposes.

Compared to event-based selection methods, the various embodiments of the invention have a greater range and specificity of selection criteria, allowing very particular types of individuals to be researched. Event-based selection methods usually are limited in scope and target population.

Self-selection or volunteer techniques carry a great deal of bias. Information provided about a respondent may be inaccurate or incomplete. By using information provided for continuing education, the accuracy and completeness of identity and characteristics is much more reliable. In addition, most embodiments of the invention allow some qualification to occur before the offer to participate is made.

Random selection and placement of study equipment approach requires significant capital investment and continual recruitment, and may only find those sample units for whom free equipment and internet access would have value. Those who already have a computer or Internet access, or see no value in such items, would not be captured by this sampling and selection. The list of respondents is fairly inflexible and cannot easily research businesses or professionals.

Voluntary selection of individuals actively interested in providing information is a self-selection technique that can only provide gross industry monitoring and customer satisfaction information. The various embodiments of the invention, however, can apply a broad range of market research tools and applications, and do not suffer from the aforementioned shortcomings of self-selection techniques.

Compared to the various embodiments of the invention, resident applications that monitor Internet usage have limited application and require intensive selection and recruitment efforts.

Use of the Internet as a communication tool has no specific advantage in enabling the market research process. The various embodiments of the invention are superior in that they facilitate the market research process. It specifically facilitates identification, selection and qualification of respondents, offering a controlled method of presenting the market research instrument and a highly transmittable incentive to the respondents.

Recording demographics of known users for advertising purposes. Compared to ZapMe's methodology, embodiments of this invention have several advantages.

First, they have greater application than for monitoring Internet usage or for targeting advertisements. In the various embodiments, the information known about the users serves as selection and qualification criteria for a wide variety of market research methodologies. Second, the various embodiments have improved application in business, professional industries, distance learning, and adult educational services, whereas ZapMe is largely limited to K-12 schools. Third, the various embodiments may be applied to any computer connected to the Internet, whereas ZapMe's method is limited to computers at sites that are subscribed to their service. Fourth, information about the users, including their demographics, is provided by the users themselves and consequently can be more individual, specific and accurate, whereas ZapMe obtains general data provided by the school about the school's general demographic profile. Fifth, the various embodiments specifically facilitate identification, selection, and qualification of respondents, offer a controlled method of presenting the market research instrument and offer a highly transmittable incentive to the respondents.

What is claimed:

1. A computerized method for identifying matches between participants and market research instruments comprising:
   a. maintaining at least one database comprising:
      i. at least one profile corresponding to a potential participant;
      ii. at least one market research instrument;
      iii. at least one target profile of demographic information associated with one or more of said market research instruments;
   b. executing computer executable instructions encoded on a computer readable medium to:
      i. access said at least one database to compare said at least one profile, corresponding to a potential participant, and said target profile;
      ii. select said target profile that sufficiently corresponds to said at least one profile, corresponding to a potential participant;
      iii. select said market research instrument associated with said target profile;
      iv. integrate said market research instrument with an educational course associated with said participant's educational endeavor;
      v. present said integrated market research instrument and education course to said participant.

2. A computerized method for identifying matches between participants and market research instruments comprising:
   a. maintaining at least one database comprising:
      i. at least one profile extracted from a registration file associated with an educational course for which a potential participant has registered;
      ii. at least one market research instrument;
      iii. at least one target profile of demographic information associated with one or more of said market research instruments;
   b. executing computer executable instructions encoded on a computer readable medium to:
      i. access said at least one database to compare said at least one profile, extracted from a registration file associated with an educational course for which a potential participant has registered; and said target profile;
      ii. select said target profile that sufficiently corresponds to said at least one profile, extracted from a registration file associated with an educational course for which a potential participant has registered;
      iii. select said market research instrument associated with said target profile;
      iv. integrate said market research instrument with an educational course associated with said participant's educational endeavor;
      v. present said integrated market research instrument and education course to said participant; and
      vi. require said market research instrument of said integrated market research instrument and education course be completed prior to completion or credit issuance of said educational course of said integrated market research instrument and education course.

3. A system for identifying matches between participants and market research instruments comprising:
   a. at least one storage device;
   b. at least one processor programmed to:
      i. maintain in the storage device, for a predetermined length of time,
         at least one profile of demographic information corresponding to a participant;
         at least one market research instrument;
         at least one target profile of demographic information associated with one or more of said market research instruments;
      ii. access said at least one storage device to compare said at least one profile, of demographic information corresponding to a participant, and said target profile;
      iii. select said target profile which corresponds to said at least one profile, of demographic information corresponding to a participant;
      iv. integrate said market research instrument, associated with said target profile, with a computerized educational course;
      v. present said integrated market research instrument, associated with said target profile, and computerized educational course to said participant;
      vi. require said market research instrument of said integrated market research instrument, associated with said target profile, and computerized educational course to be completed prior to processing completion of said education course of said integrated market research instrument, associated with said target profile, and computerized educational course.

4. A computer readable medium having computer executable instructions for identifying matches between participants and market research instruments by performing a set of steps comprising:
   a. obtaining a profile associated with a potential participant;
   b. determining whether said profile, associated with a potential participant, qualifies for at least one market research instrument;
   c. integrating said market research instrument with an electronic training course;
   d. presenting said integrated market research instrument and electronic training course to said participant where said participant qualifies for said market research instrument;
   e. repeating said obtaining step through said repeating step for a market study until a predetermined sample of said participants, qualifying for said market research instrument, have responded.

5. A computer readable medium having computer executable instructions for identifying matches between participants and market research instruments by performing a set of steps comprising:
   a. obtaining a profile associated with a potential participant in an electronic training course;
   b. determining whether said profile, associated with a potential participant in an electronic training course, qualifies for association with at least one market research instrument;
   c. integrating said market research instrument, for which said profile, associated with a potential participant in an electronic training course qualifies, with said electronic training course;
   d. presenting said integrated electronic training course and market research instrument to said participant associated with said profile which qualifies for association with at least one market research instrument;
   e. monitoring said participant's progress through said integrated electronic training course and market research instrument;
   f. storing a history associated with said participant's progress through said integrated electronic training course and market research instrument;
   g. allowing said participant to exit said integrated electronic training course and market research instrument and re-enter said integrated electronic training course and market research instrument at a point in said integrated electronic training course and market research instrument associated with said participant's exit from said integrated electronic training course and market research instrument.

6. A computer readable medium having computer executable instructions for performing a method comprising:
   a. creating a profile associated with a participant in an electronic training course from a registration form associated with said training course;
   b. maintaining a database comprising a plurality of market research instruments directed to a plurality of market venues;
   c. maintaining a database of at least one target profile wherein each of said at least one target profile is associated with one or more of said market research instruments;
   d. comparing said profile, associated with a participant in an electronic training course from a registration form associated with said training course, against said target profiles;
   e. selecting a target profile sufficiently corresponding to said profile, associated with a participant in an electronic training course from a registration form associated with said training course;
   f. integrating one or more of said market research instruments associated with said target profile in said electronic training course;
   g. presenting said integrated electronic training course and market research instrument to said participant associated with said profile, associated with a participant in an electronic training course from a registration form associated with said training course, corresponding to said target profile.

7. A computer readable medium having computer executable instructions for identifying matches between participants and market research instruments comprising:
   a. creating a profile associated with a participant in an electronic training course from a registration form associated with said training course;
   b. supplementing said profile, associated with a participant in an electronic training course from a registration form associated with said training course, with at least one item of information included in a professional membership database associated with said participant by accessing said professional membership database;
   c. selecting at least one market research instrument corresponding to said profile, associated with a participant in an electronic training course from a registration form associated with said training course;
   d. integrating said market research instrument into said electronic training course;
   e. presenting said integrated market research instrument and electronic training course to said participant.

* * * * *